US012809418B1

(12) United States Patent
Peng et al.

(10) Patent No.: US 12,809,418 B1
(45) Date of Patent: Nov. 24, 2026

(54) AUDIO-VISUAL PLAYBACK SYSTEM, DEVICE, METHOD AND STORAGE MEDIUM FOR INTELLIGENT USER POSE TRACKING

(71) Applicant: Jiangsu Cytoderm Intelligent Technology Co., Ltd., Suzhou (CN)

(72) Inventors: Tianfang Peng, Suzhou (CN); Yingzhou Han, Suzhou (CN); Yawei Jueluo, Suzhou (CN); Xiang Zhou, Suzhou (CN); Li Yuan, Suzhou (CN); Yibing Liu, Suzhou (CN); Kefei Tu, Suzhou (CN)

(73) Assignee: JIANGSU CYTODERM INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/370,841

(22) Filed: Oct. 28, 2025

(30) Foreign Application Priority Data

Aug. 22, 2025 (CN) ........................ 202511181781.3

(51) Int. Cl.

| | |
|---|---|
| ***G06F 1/16*** | (2006.01) |
| ***F16M 11/04*** | (2006.01) |
| ***F16M 11/10*** | (2006.01) |
| ***F16M 11/18*** | (2006.01) |
| ***G06F 3/01*** | (2006.01) |
| ***G06F 3/147*** | (2006.01) |

(52) U.S. Cl.
CPC ......... *G06F 1/1605* (2013.01); *F16M 11/046* (2013.01); *F16M 11/10* (2013.01); *F16M 11/18* (2013.01); *G06F 3/011* (2013.01); *G06F 3/147* (2013.01)

(58) Field of Classification Search
None
See application file for complete search history.

(56) References Cited

U.S. PATENT DOCUMENTS

| | | | | |
|---|---|---|---|---|
| 2020/0368616 A1* | 11/2020 | Delamont | ............... | A63F 13/21 |
| 2021/0397250 A1* | 12/2021 | Akgul | ..................... | G06F 3/011 |
| 2024/0351209 A1* | 10/2024 | Graabæk | ................ | B25J 9/1674 |
| 2025/0339220 A1* | 11/2025 | Brubaker | .............. | A61B 34/10 |

* cited by examiner

*Primary Examiner* — Stephen T. Reed
(74) *Attorney, Agent, or Firm* — Bayramoglu Law Offices LLC

(57) ABSTRACT

An audio-visual playback system includes: a display terminal, an actuator, a sensing unit, a controller and an integrated structure. The controller calculates in real time the target pose that meets the viewing relationship based on the data collected by the sensing unit, and plans and executes a trajectory within a preset time window and under velocity/acceleration/jerk limiting constraints, so that the display terminal maintains a comfortable angle and distance when the user moves, and enters a safe state and smoothly recovers in the event of near-field, external force, or sensing mismatch. The integrated structure incorporates the display terminal, actuator, sensing unit, controller, and drive power supply into the same device or housing, completing unified calibration and parameter solidification of the intrinsic parameters of the sensor and the extrinsic parameters of the sensor and the display/actuator during the factory stage.

20 Claims, 5 Drawing Sheets

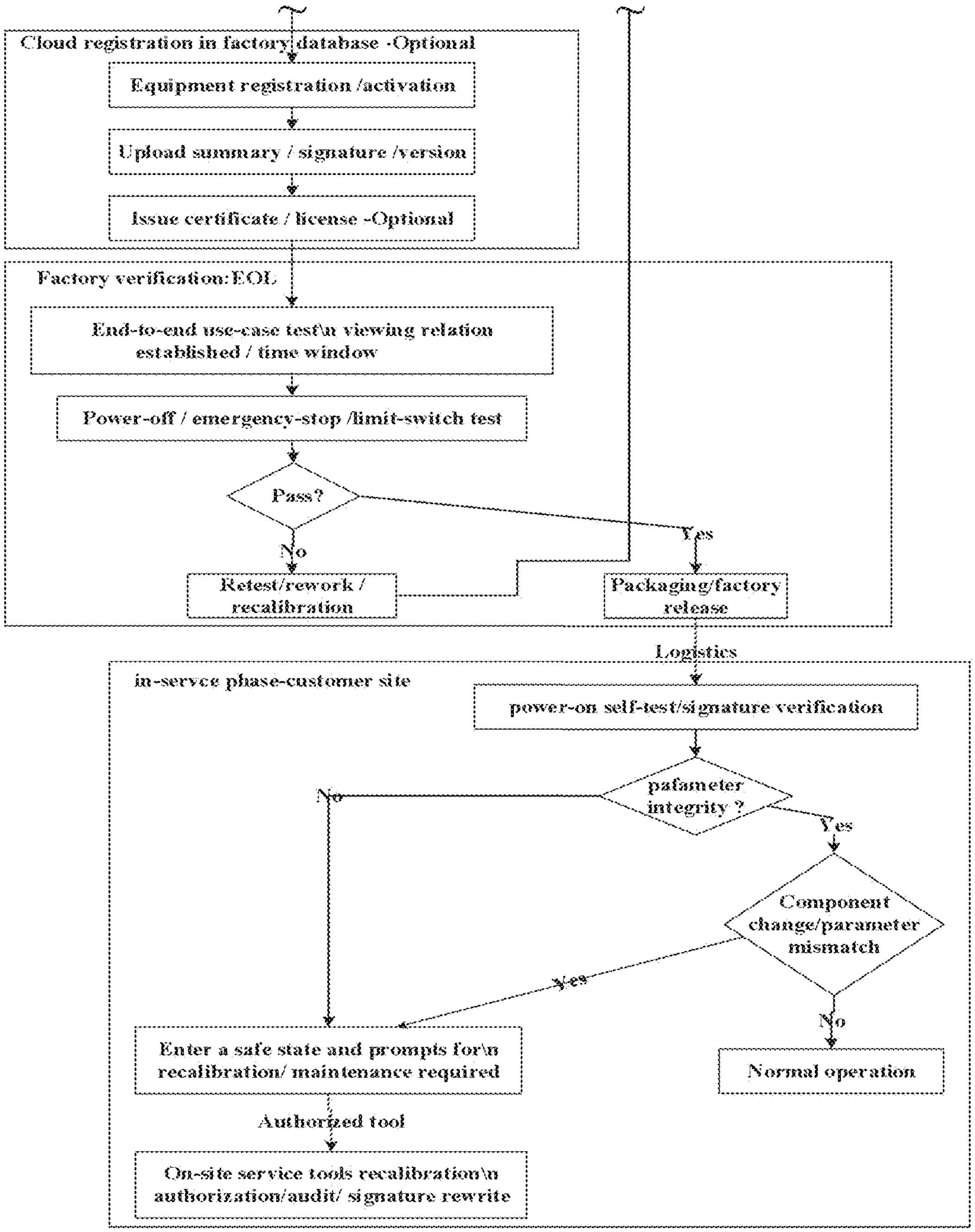
Continuous part of FIG. 5

AUDIO-VISUAL PLAYBACK SYSTEM, DEVICE, METHOD AND STORAGE MEDIUM FOR INTELLIGENT USER POSE TRACKING

CROSS REFERENCE TO THE RELATED APPLICATIONS

This application is based upon and claims priority to Chinese Patent Application No. 202511181781.3, filed on Aug. 22, 2025, the entire contents of which are incorporated herein by reference.

TECHNICAL FIELD

The present invention relates to the field of human-computer interaction and display technology for robots, and in particular to an audio-visual playback system, device, method, and storage medium for intelligent user pose tracking.

BACKGROUND

In desktop and indoor scenarios, fixed mounts or gimbals with only pitch/azimuth adjustment cannot adjust in real time as the user moves, making it difficult to maintain a stable and comfortable viewing geometry relationship; While head-mounted display devices can follow the movements of the user's head, they are not suitable for long-term wear and cannot support shared viewing among multiple users.

Existing robotic arm+display solutions are mostly used in industrial or advertising scenarios, lacking ergonomics-oriented and interaction-friendly closed-loop control and safe collaboration capabilities. In addition, existing auto-follow technologies mostly focus on the target being filmed, rather than on the coordinated control of the angle and distance between the viewer and the display terminal.

To meet the application requirements of large-size (≥27-40 inch screen), heavy-load (integrated module with camera unit) display terminals, traditional stands that rely on gas springs/friction plates to achieve self-locking and incorporate manual adjustment face an irreconcilable trade-off between load capacity, cost, and stability: to achieve manual displacement, the transmission ratio must be reduced, resulting in the inability to maintain stable angle and distance under high load, and making it impossible to continuously perform active tracking of the user's line-of-sight pose.

Meanwhile, in existing patents and products, display terminals and stands are mostly manufactured and sold separately, requiring users to assemble them on their own. This model makes it difficult to achieve an integrated design and unified time synchronization of sensing, computation, control, and actuation, nor is it possible to complete the unified calibration and solidification of mechanical parameters for specific devices and sensor internal/external parameters (for example, coordinate system transformation parameters $\{W \rightarrow D\}$, $\{D \rightarrow S\}$, delay compensation parameters, etc.) at the factory stage, leading to cumulative errors caused by installation tolerances and cross-brand combinations, which severely affect the continuous, stable, active tracking experience without manual force.

SUMMARY

The present invention provides an audio-visual playback system, device, method, and storage medium for intelligent user pose tracking, to solve the above problems. When the user moves or changes pose, it continuously maintains both the included angle between the display surface normal and the user's line of sight and the viewing distance within a comfortable range; at the same time, in the near-field of the user, under the impact of external forces, or in case of sensing mismatch, it ensures safe retreat/pause and smooth recovery. Moreover, the invention adopts an integrated design, completing the calibration of mechanical parameters and sensor internal/external parameters, time synchronization/delay compensation, and parameter solidification storage, and binding various parameters to the device serial number at the factory stage. During the device's operation, the device performs driving and verification based on the bound parameters, effectively avoiding the impact of user installation errors on active tracking, suppressing sudden motion changes while ensuring comfort, and improving viewing stability and safety.

The present invention provides an audio-visual playback system for intelligent user pose tracking, including: a display terminal, an actuator, a sensing unit, a controller, and an integrated structure;

- wherein, the actuator has at least two degrees of freedom, with at least one rotary joint actively driven by a motor through a high reduction ratio transmission, and carries a display terminal at its end;
- the sensing unit is configured to acquire the relative pose data between the user and the display terminal and its confidence level;
- the controller is configured to calculate a target display pose that meets the user's viewing relationship based on the relative pose data, and, under preset time window and velocity/acceleration/jerk limiting constraints, generate a trajectory from the current display pose to the target display pose, and drive the actuator to transform to the target display pose;
- based on at least one of near-field detection distance, external force/torque, or the confidence level, a safety state machine is constructed, which executes retreat or pause when the entry conditions of the safety state machine are met, and, resumes the control of maintaining the user's viewing relationship when the exit conditions are met;
- the integrated structure incorporates the display terminal, actuator, sensing unit, controller, and drive power supply into the same device or housing.

Preferably, in an audio-visual playback system for intelligent user pose tracking, the actuator is at least one of a linear lifting module, a pitching module/an azimuth module, or a combination thereof, forming 2 degrees of freedom or 3 degrees of freedom mechanism.

Preferably, in an audio-visual playback system for intelligent user pose tracking, the degrees of freedom include a degree of freedom for changing the distance between the user and the display terminal;

- wherein, the degree of freedom for changing the distance between the user and the display terminal is an electric linear lift and/or rotation around an axis that is not parallel to the normal of the display surface.

Preferably, in an audio-visual playback system for intelligent user pose tracking, the controller generates a trajectory from the current display pose to the target display pose within a preset time window and under velocity/acceleration/jerk limiting constraints, specifically including:

- when the user's viewing relationship deviates from its corresponding threshold, the controller performs online re-planning and within the preset time window generates a trajectory that meets the jerk limiting constraint;

otherwise, within the preset time window, a trajectory meeting the velocity/acceleration limiting constraint is generated.

Preferably, in an audio-visual playback system for intelligent user pose tracking, the viewing relationship at least constrains the included angle between the display surface normal of the display terminal and the user's line of sight direction and/or the distance between the user's observation point and the display surface.

Preferably, in an audio-visual playback system for intelligent user pose tracking, the near-field detection distance is detected through at least one of a camera, infrared camera, structured light, time-of-flight sensing, millimeter-wave radar, or ultrasound.

Preferably, in an audio-visual playback system for intelligent user pose tracking, the external force or torque is detected using observation and estimation of motor current/back electromotive force and/or end/joint torque sensors.

Preferably, in an audio-visual playback system for intelligent user pose tracking, the sensing unit is arranged at least at one location among the display terminal, the actuator, an environment fixed point, or a user-wearable end, and performs time synchronization and data fusion via a communication link.

Preferably, in an audio-visual playback system for intelligent user pose tracking, the safety state machine includes the states of normal following, early warning, retreat/pause, and recovery;

the conditions for entering the safety state include at least one of near-field detection distance $<R_{safe}$, joint torque/end force $>\tau_{max}/F_{max}$, confidence level $p<p_{min}$, or loss time $>t_{lost}$;

wherein, near-field detection distance includes the distance between the user and the end or connecting rod;

conditions for exiting the safety state include at least one of risk elimination, stable timing meeting $t_{stable}$ as well as manual authorization.

Preferably, in an audio-visual playback system intelligent user pose tracking, the integrated structure performs calibration of the sensor intrinsic parameters as well as the extrinsic parameters between the sensor and the display terminal and actuator at the factory stage, and configures time synchronization/delay compensation, mechanical parameters, and safety thresholds;

the calibrated parameters and configured parameters are respectively bound to the device serial number and solidified for storage;

during operation, the controller performs verification and control based on the solidified stored parameters, and enters a safe state and/or prompts for recalibration when detecting component replacement or parameter mismatch.

The present invention provides an audio-visual playback device for intelligent user pose tracking, including the aforementioned audio-visual playback system.

The present invention provides an audio-visual playback method for intelligent user pose tracking, including:

collecting the relative pose data between the user and the display terminal and its confidence level;

calculating a target display pose that meets the user's viewing relationship based on the relative pose data;

within a preset time window and under velocity/acceleration/jerk limiting constraints, generating a trajectory from the current display pose to the target display pose;

driving the actuator to move along the trajectory to change the display position of the display terminal to the target display pose;

constructing a safety state machine based on at least one of near-field detection distance, external force/torque, or the confidence level, when the entry conditions of the safety state machine are met, executing retreat or pause, and when the exit conditions are met, resuming the control of maintaining the user's viewing relationship.

The present invention provides a computer-readable storage medium, on which a computer program is stored, the computer program being executed by the processor of the controller to implement the aforementioned audio-visual playback method.

Compared with the prior art, the present invention has at least the following beneficial effects:

The present invention obtains in real time the relative pose between the user and the display terminal through a sensing unit, and the controller dynamically calculates the target display pose based on this, generating a smooth trajectory under constraints of velocity, acceleration, and jerk limiting, so that the included angle between the display surface normal and the user's line of sight, as well as the viewing distance, are always maintained within a comfortable range. Even if the user moves or changes pose, the actuator can make precise adjustments through multi-degree-of-freedom rotary joints, avoiding the need for the user to frequently adjust their body due to uncomfortable device poses, significantly reducing neck and eye fatigue, and improving long-term viewing comfort. Furthermore, based on near-field detection distance, external force/torque, or sensing data confidence level, a safety state machine is constructed. When the user approaches the device, an external force impact occurs, or sensing data mismatches, it can promptly perform retreat or pausing actions, effectively avoiding safety risks such as collisions or squeezing; once the risk is eliminated, normal tracking control can be smoothly resumed, ensuring both device safety and continuity of user experience. At the same time, the high reduction ratio transmission design of the rotary joint motor improves the driving stability and force control accuracy of the actuator, effectively reducing the safety hazards of the actuator's mechanical actions caused by changes in the relative position data between the user and the display terminal during viewing. The present invention adopts an integrated structure that incorporates the display terminal, actuator, sensing unit, controller, and drive power supply into the same device or housing. At the factory stage, the internal/external parameters of the sensors and mechanical parameters are calibrated, and time synchronization/delay compensation are configured, and the parameters are bound and solidified to the device serial number. During device operation, the controller drives and verifies using the solidified parameters, fundamentally avoiding the impact of errors caused by user installation on tracking accuracy; meanwhile, the trajectory planning of the present invention suppresses motion mutations through constraints of a preset time window, ensuring smooth and stable pose adjustments of the display terminal, reducing the likelihood of image shaking or jumping, and greatly improving viewing stability.

Other features and advantages of the present invention will be set forth in the following description, and in part will be apparent from the description, or may be learned by practice of the present invention. The objectives and other advantages of the invention may be realized and attained by the structure particularly pointed out in the present application.

The following provides a more detailed description of the technical solution of the present invention through the accompanying drawings and embodiments.

BRIEF DESCRIPTION OF THE DRAWINGS

The accompanying drawings are provided to further understand the present invention, and constitute a part of the specification. They are used together with the embodiments of the present invention to explain the invention, and do not constitute a limitation to the present invention. In the drawings.

DETAILED DESCRIPTION OF THE EMBODIMENTS

The following describes preferred embodiments of the present invention in conjunction with the accompanying drawings. It should be understood that the preferred embodiments described herein are only for illustrating and explaining the present invention, and are not intended to limit the present invention.

Embodiment 1

The present invention provides an audio-visual playback system for intelligent user pose tracking, including: a display terminal, an actuator, a sensing unit, a controller, and an integrated structure;

- wherein, the actuator has at least two degrees of freedom, with at least one rotary joint actively driven by a motor through a high reduction ratio transmission, and carries a display terminal at its end;
- the sensing unit is configured to acquire the relative pose data between the user and the display terminal and its confidence level;
- the controller is configured to calculate a target display pose that meets the user's viewing relationship based on the relative pose data, and, under preset time window and velocity/acceleration/jerk limiting constraints, generate a trajectory from the current display pose to the target display pose, and drive the actuator to transform to the target display pose;
- based on at least one of near-field detection distance, external force/torque, or the confidence level, a safety state machine is constructed, which executes retreat or pause when the entry conditions of the safety state machine are met, and, resumes the control of maintaining the user's viewing relationship when the exit conditions are met;
- the integrated structure incorporates the display terminal, actuator, sensing unit, controller, and drive power supply into the same device or housing.

Figure 1:
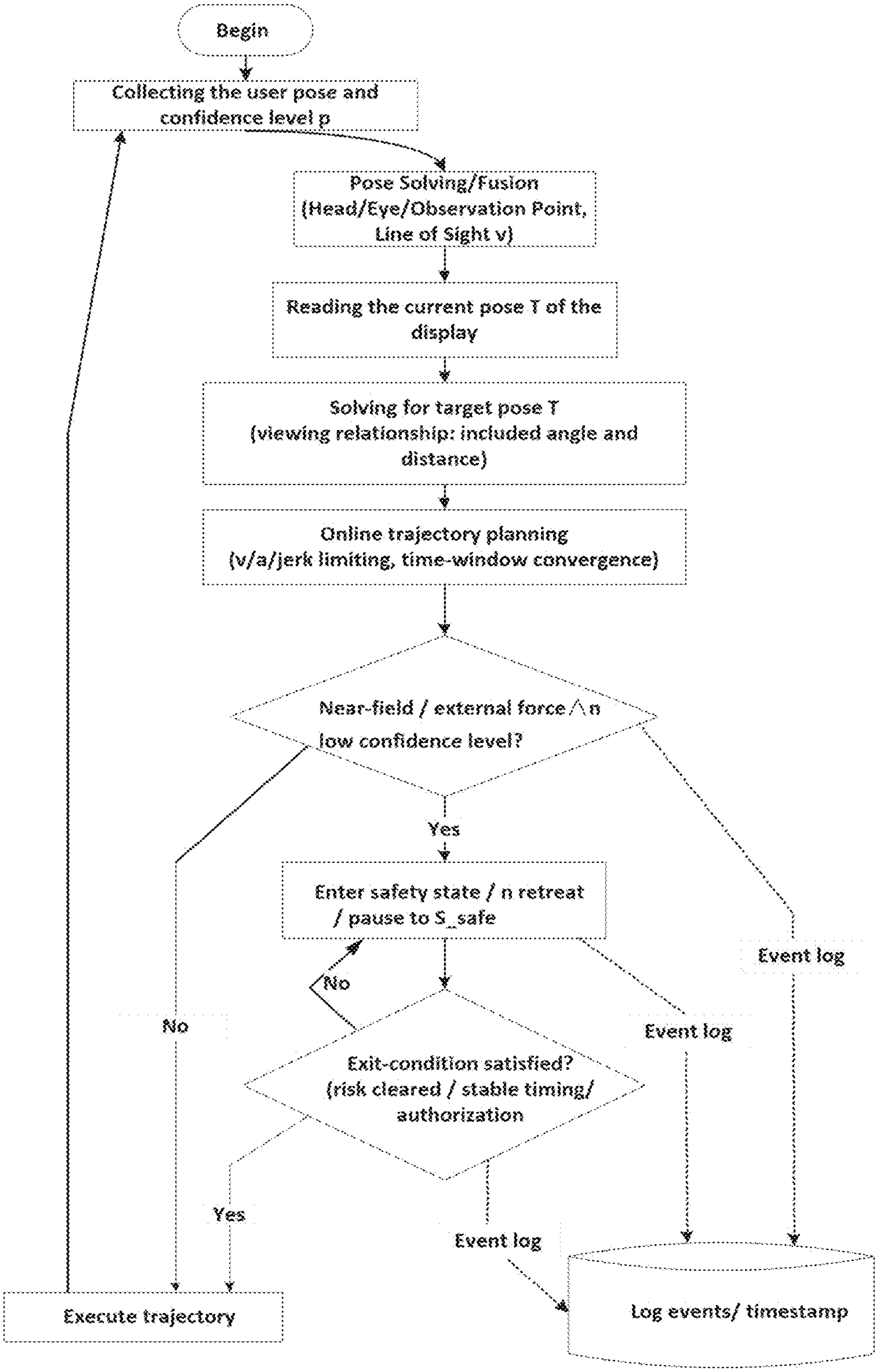
FIG. 1 is the intelligent user pose tracking control process of an audio-visual playback system for intelligent user pose tracking.

In this embodiment, as shown in FIG. 1, the process of intelligent user pose tracking control is implemented, including user relative pose sensing and confidence level estimation→target solving→trajectory planning→actuator control, while also featuring a parallel safety monitoring path driving state machine and logs/indication prompts.

In this embodiment, relative position data refers to data used to describe the positional relationship between the user and the display terminal, including but not limited to the included angle between the display surface normal of the display terminal and the user's line of sight direction, the distance between the user's observation point and the display surface, the user's neck rotation angle, etc.

In this embodiment, a high reduction ratio transmission can be achieved through a planetary gear, harmonic reducer, or RV reducer, or through a direct drive motor or low reduction ratio transmission (for example, a gear-rack paired with a damper), combined with control algorithms to compensate for precision loss, to achieve it.

The degree of freedom for changing the distance is driven by an electric linear actuator.

In this embodiment, the end load can be up to 10 kg and/or the joint output torque can be up to 30 Nm.

In this embodiment, the user's viewing relationship includes one or more of the following constraints:

- Angle constraint: the included angle θ between the display surface normal n and the user's line of sight direction v falls within the threshold range [0, θ_th];
- Distance constraint: the shortest distance d between the user's observation point and the display surface falls within the comfortable range [d_min, d_max];
- Optional indicators: effective field-of-view ratio, occlusion/glare score, neck torsion cost, etc.

In this embodiment, during the process of calculating the target display pose that meets the user's viewing relationship based on relative pose data, a cost function (including but not limited to a cost function for human-computer interaction comfort) is used to evaluate the pose of the display terminal. Assuming that the user's viewing relationship includes multiple constraints, such as angle, distance, field of view, and user neck torsion angle, taking the cost function for human-computer interaction comfort as an example, the target cost function value for the user's current position is expressed as follows:

$$J(T) = \alpha \cdot \theta(T) + \beta \cdot |d(T) - d^*| + \gamma \cdot \text{FOV\_penalty}(T) + \eta \cdot \text{neck\_torsion}\ (T)$$

Among them, T represents the current pose of the display terminal, θ(T) represents the included angle between the normal direction of the display surface of the display terminal and the user's line of sight direction; a represents the weight of the angle constraint; d(T) represents the actual distance between the user and the display terminal; d* represents the ideal viewing distance for the user (for example, the preset comfortable viewing distance is 60-80 cm); |d(T)−d*| represents the deviation between the actual distance and the ideal distance, used to measure whether the distance between the display terminal and the user is within the comfortable range; β represents the weight of the distance constraint; FOV_penalty(T) represents the field of view penalty term (non-negative value), used to measure whether the display terminal is within the user's effective field of view. When the display terminal exceeds the user's comfortable field of view range (for example, when the edge of the screen is beyond the user's peripheral vision), the value of this term increases; γ represents the weight of the field of view constraint; neck_torsion(T) represents the neck torsion angle generated by the user in the current pose in order to clearly see the display terminal. The greater the neck torsion angle, the more easily the user becomes fatigued, and the higher the cost of this term; η represents the weight of neck comfort.

The smaller the value of the target cost function, the more the pose T of the display terminal conforms to the user's ideal viewing state.

Beneficial effects of the above technical solution: The present invention acquires the relative pose between the user and the display terminal in real time through the sensing unit. Based on this, the controller dynamically calculates the target display pose and generates a smooth trajectory under constraints of velocity, acceleration, and jerk limiting, ensuring that the included angle between the display surface normal and the user's line of sight, as well as the viewing distance, always remain within a comfortable range. Even when the user moves or changes pose, the actuator can make precise adjustments through multi-degree-of-freedom rotary joints, avoiding the need for the user to frequently adjust their body due to uncomfortable device pose, significantly reducing neck and eye fatigue, and improving comfort during long viewing sessions. Furthermore, a safety state machine is constructed based on near-field detection distance, external force/torque, or sensing data confidence level. When the user approaches the device, an external force impact occurs, or sensing data mismatch is detected, the system can promptly execute retreat or pause actions, effectively avoiding safety risks such as collisions or squeezing; once the risk is cleared, normal tracking control can be smoothly resumed, ensuring both device safety and continuity of user experience. In addition, the high reduction ratio transmission design of the rotary joint motor improves the driving stability and force control accuracy of the actuator, effectively reducing the safety hazards of the actuator's mechanical actions caused by changes in the relative position data between the user and the display terminal during viewing. The present invention adopts an integrated structure that incorporates the display terminal, actuator, sensing unit, controller, and drive power supply into the same device or housing. At the factory stage, the internal/external parameters of the sensors and mechanical parameters are calibrated, and time synchronization/delay compensation are configured, and the parameters are bound and solidified to the device serial number. During device operation, the controller drives and verifies using the solidified parameters, fundamentally avoiding the impact of errors caused by user installation on tracking accuracy; at the same time, the trajectory planning of the present invention suppresses motion mutations through preset time window constraints, ensuring smooth and stable pose adjustments of the display terminal, reducing the likelihood of image shaking or jumping, and greatly improving viewing stability.

Embodiment 2

Based on Embodiment 1, the actuator is at least one of a linear lifting module and a pitch module/an azimuth module or a combination thereof, forming a 2-degree-of-freedom or 3-degree-of-freedom mechanism.

Figure 2:
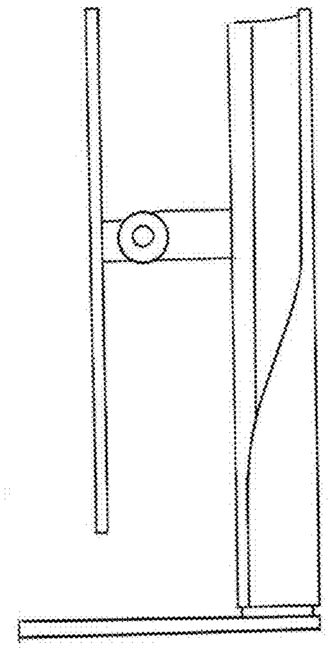
FIG. 2 is an effect presentation diagram of the display terminal pose adjustment when the user is in a forward-looking state.

In this embodiment, as shown in FIG. 2, under the user's forward-looking state, the final effect diagram of the display terminal's pose adjustment through the actuator is presented.

Figure 3:
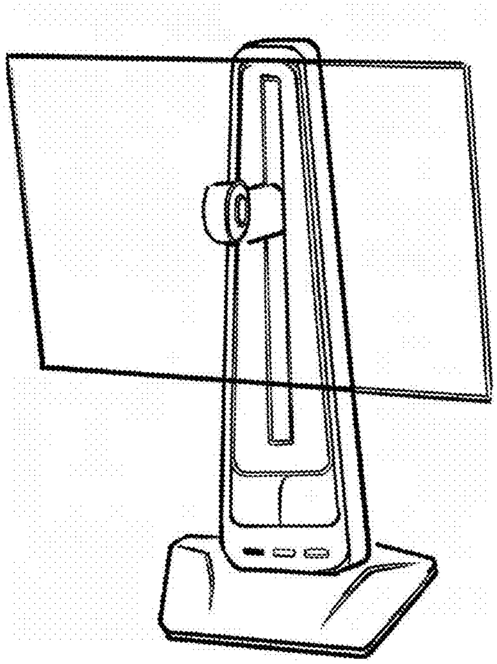
FIG. 3 is an effect presentation diagram of the display terminal pose adjustment when the user is in an upward-looking state.

In this embodiment, as shown in FIG. 3, under the user's upward-looking state, the final effect diagram of the display terminal's pose adjustment through the actuator is presented.

Beneficial effects of the above technical solution: The invention achieves vertical height adjustment through a linear lifting module, ensuring that the display terminal can be height-adjusted according to the height of different users and their eye height when sitting/standing; pitch motion (rotation around the horizontal axis) provides the basis for the actuator to adjust the upward and downward tilt angle of the display terminal; azimuth motion (rotation around the vertical axis) provides the basis for the actuator to adjust the left and right orientation of the display surface. A 2-degree-of-freedom mechanism (e.g., linear lifting+pitch, linear lifting+azimuth) can meet basic height and single-direction pose adjustments; a 3-degree-of-freedom mechanism (e.g., linear lifting+pitch+azimuth) can fully adjust the spatial pose of the display terminal, following the user's viewing pose for omnidirectional movement and pose changes in both horizontal and vertical directions, ensuring that the display terminal can align with the user from multiple dimensions. The multi-degree-of-freedom setup is conducive to flexibly adapting to various application scenarios.

Embodiment 3

On the basis of Embodiment 1, the degree of freedom includes a degree of freedom for changing the distance between the user and the display terminal;

wherein, the degree of freedom for changing the distance between the user and the display terminal is an electric linear lift and/or rotation around an axis that is not parallel to the normal of the display surface.

Beneficial effects of the above technical solution: The present invention provides two methods—electric linear lift and rotation around an axis that is not the display surface normal—which can independently or cooperatively change the distance between the user and the display terminal. This can cover various scenarios such as the user's linear movement (e.g., switching between sitting and standing postures) and pose tilting (e.g., head tilting, oblique viewing), breaking the limitations of a single adjustment method. It can more precisely match the user's comfortable viewing distance in different states, reduce visual fatigue or neck adjustment burden caused by inappropriate distance, and effectively improve the user's comfort during long-term viewing.

Embodiment 4

Based on Embodiment 1, within a preset time window and under velocity/acceleration/jerk limiting constraints, the controller generates a trajectory from the current display pose to the target display pose, specifically including:

when the user's viewing relationship deviates from its corresponding threshold, the controller performs online re-planning and within the preset time window generates a trajectory that meets the jerk limiting constraint;

otherwise, within the preset time window, a trajectory meeting the velocity/acceleration limiting constraint is generated.

Beneficial effects of the above technical solution: When the user's viewing relationship (e.g., the included angle between the display surface normal and the line of sight, viewing distance) deviates from the threshold, the controller achieves a rapid response to sudden changes in user pose through online re-planning and jerk-limited trajectory generation. The jerk constraint can effectively suppress sudden shocks in the trajectory, ensuring that the display terminal maintains smooth motion during rapid adjustments, avoiding image jitter or severe device shaking caused by sudden user movements, turns, and other actions, thereby ensuring viewing continuity. When the viewing relationship is stable, conventional trajectory planning with velocity/acceleration limits is adopted, which reduces computational resource consumption while maintaining smoothness, improves system operating efficiency, and ensures stable operation of the display terminal, thereby enhancing long-term viewing comfort. This realizes an adaptive trajectory generation method that avoids both slow response or over-adjustment, while enhancing the system's adaptability to complex user behaviors and improving overall operational robustness. At the same time, by applying constraints through a preset time window during trajectory generation, it ensures that trajectory generation is always completed within a controllable time range, effectively avoiding a decline in viewing experience caused by adjustment delays.

Embodiment 5

Based on Embodiment 1, the viewing relationship at least constrains the included angle between the display surface normal of the display terminal and the user's line of sight direction and/or the distance between the user's observation point and the display surface.

Beneficial effects of the above technical solution: The invention takes the included angle between the display surface normal and the user's line of sight direction, and the distance between the user's observation point and the display surface, as the core constraints of the viewing relationship, directly targeting the two key dimensions that affect the viewing experience: directional alignment and spatial distance appropriateness. The included angle between the display surface normal and the user's line of sight ensures that the display surface is aligned with the user's line of sight, reducing visual distortion and focus strain caused by screen tilt; the distance between the user's observation point and the display surface ensures that the user's distance from the screen remains within the comfortable viewing range of the human eye, avoiding eye fatigue from being too close and loss of detail sensing from being too far. Whether one or both constraints are applied, they provide a clear target reference for system pose adjustment, ensuring that the optimization direction does not deviate from the user's core needs, while allowing the system to flexibly adjust optimization priorities according to actual scenarios. For example, when the user maintains a fixed sitting pose but slightly turns their head, the angle constraint can be prioritized to ensure gaze alignment; when the user moves forward or backward without changing direction, the distance constraint can be emphasized to maintain clear sensing; and when the user moves extensively, both constraints can be activated simultaneously for comprehensive adaptation. This not only meets the personalized needs of different users but also adapts to diverse usage scenarios such as home, office, and leisure, enhancing the product's universality.

Embodiment 6

Based on Embodiment 1, near-field detection distance is detected using at least one of a camera, infrared camera, structured light, time-of-flight sensing, millimeter-wave radar, or ultrasound.

Beneficial effects of the above technical solution: The present invention can use various devices individually or in combination for near-field detection, which helps improve the system's adaptability to various environments and the universality of the product.

Embodiment 7

Based on Embodiment 1, the external force or torque is detected using motor current/back EMF (back electromotive force) observation and/or end/joint torque sensors.

Beneficial effects of the above technical solution: The end/joint torque sensor of the present invention can provide high-precision direct measurement data, suitable for scenarios with high force control accuracy requirements (for example, sensitive response when the user lightly touches the device), but requires additional hardware cost; motor current/back EMF observation analyzes existing drive data through algorithms without adding new sensors, which can reduce hardware costs while meeting basic external force detection needs (such as overload determination during device jamming or severe collision), enabling the product to be flexibly combined according to positioning, thereby enhancing the product's market adaptability.

Embodiment 8

Based on Embodiment 1, the sensing unit is arranged at at least one position among the display terminal, the actuator, the environmental fixed point, or the user-wearable end, and performs time synchronization and data fusion through a communication link.

In this embodiment, the sensing unit supports two technical approaches: multi-modal sensor fusion and single-sensor positioning. When adopting the multi-modal sensor fusion scheme, the sensing unit can be placed in multiple locations such as the display terminal, actuator, environment fixed points, or user-wearable ends. Through the collaborative work of multiple types of sensors, data complementarity can be achieved. For example, a camera or ToF (Time of Flight) sensor can be used to obtain visual information such as the user's head or eye features and sigh of light direction, supplemented by near-field detection devices such as ultrasonic sensors or structured light equipment to provide distance parameter input for the safety state machine. An IMU (Inertial Measurement Unit) or joint torque sensor can also be optionally configured to assist in capturing dynamic pose changes of the user, thereby improving the robustness of pose calculation in fast-moving scenarios;

Finally, time synchronization and data fusion are achieved through the communication link, specifically including:

- based on data collected by multi-modal sensors, generating multi-source raw pose information;
- through the controller, performing spatiotemporal alignment on the multi-source raw pose information, then filtering the aligned data before fusion, and calculating the confidence level indicator of the fused data.

Beneficial effects of the above technical solution: The sensing unit of the present invention can be flexibly arranged at multiple positions such as the display terminal, actuator, fixed environmental points, or user-wearable ends, allowing it to capture the relative pose information between the user and the device from different perspectives. This facilitates the system's adaptation to the relative position data collection requirements of various application scenarios (for example, home, office, leisure, etc.).

Embodiment 9

Figure 4:
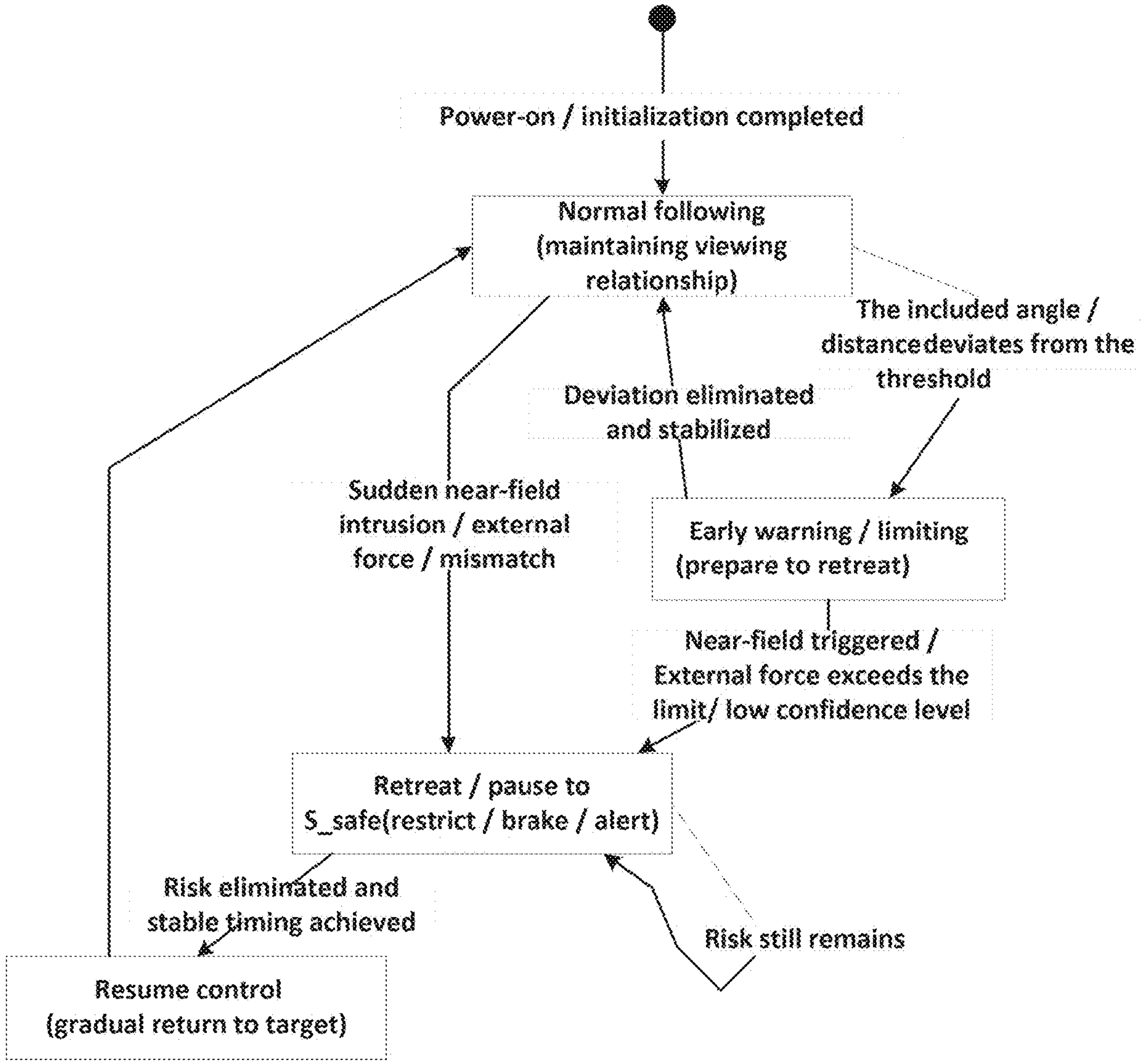
FIG. 4 is a workflow diagram of the safety state machine.

On the basis of Embodiment 1, as shown in FIG. 4, the safety state machine includes the states of normal following, early warning, retreat/pause, and recovery;

The conditions for entering the safety state include at least one of near-field detection distance<R_safe, joint torque/end force>τ_max/F_max, confidence level p<p_min, or loss time>t_lost;

Among them, near-field detection distance includes the distance between a user and the end or connecting rod;

Conditions for exiting the safety state include at least one of risk elimination, stable timing meeting t_stable as well as manual authorization.

In this embodiment, the safety state machine constructs a stepwise safety protection logic through hierarchical state division of normal following→early warning→retreat/pause→recovery:

In the normal following state, the system focuses on pose tracking and comfort adjustment to ensure smooth viewing; when a potential risk arises, it first enters the early warning state (for example, slight approach, low-confidence data), and reduces the possibility of risk spread through early intervention (for example, limiting movement velocity); if the risk escalates, it enters the retreat/pause state, eliminating immediate danger through active avoidance or stopping movement; after the risk is eliminated, it smoothly transitions back to normal mode through the recovery state, ensuring both the timeliness of safety protection and reducing unnecessary interruptions to normal use caused by safety actions, thus achieving a balanced handling between safeguarding user safety and maintaining a smooth user experience.

In this embodiment, a near-field detection distance<R_safe can directly prevent the risk of collision between the user and the device (end or connecting rod).

Joint torque/end force>τ_max/F_max can effectively identify mechanical overload risks such as device jamming or external force impact.

Confidence level p<p_min or loss time>t_lost can effectively avoid the risk of malfunction caused by unreliable sensing data.

In this embodiment, R_safe represents the safety distance threshold; τ_max represents the joint torque threshold; F_max represents the end force threshold; p_min represents the confidence level threshold; t_lost represents the loss time threshold.

Beneficial effects of the above technical solution: The invention constructs a safety state machine based on near-field detection distance, external force/torque, or sensing data confidence. When the user approaches the device, an external force impact occurs, or sensing data mismatch is detected, it can promptly execute retreat or pause actions, effectively avoiding safety risks such as collisions and squeezing. Once the risk is eliminated, it can smoothly resume normal tracking control, ensuring both the safety of the device and the continuity of user operation. Meanwhile, the high reduction ratio transmission design of the rotary joint motor improves the driving stability and force control accuracy of the actuator, effectively reducing the safety hazards of the actuator's mechanical actions caused by changes in the relative position data between the user and the display terminal during viewing.

Embodiment 10

On the basis of Embodiment 1, the integrated structure calibrates the intrinsic parameters of the sensor as well as the extrinsic parameters between the sensor and the display terminal and actuator during the factory stage, and configures time synchronization/delay compensation, mechanical parameters, and safety thresholds;

The calibrated parameters and configured parameters are respectively bound to the device serial number and solidified for storage;

When the controller is running, it performs verification and control based on the solidified storage parameters, and enters a safe state and/or prompts for recalibration when a component replacement or parameter mismatch is detected.

Figure 5:
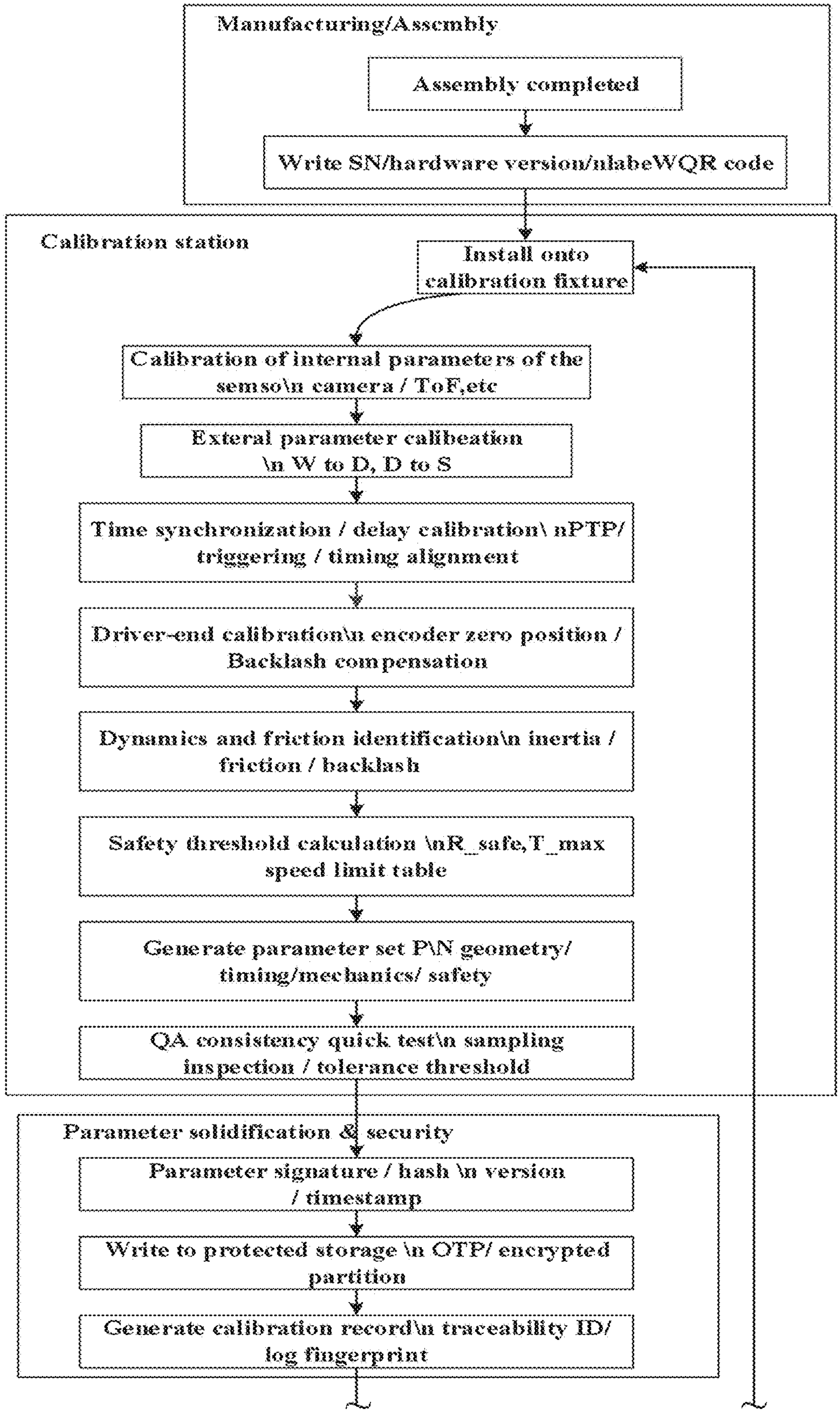
FIG. 5 is a flowchart of integrated calibration and parameter solidification.

In this embodiment, as shown in FIG. 5, a flowchart of integrated structure calibration and parameter solidification is provided, specifically including:

First, after manufacturing and assembly are completed, the SN hardware version vN label QR code is written; next, at the calibration workstation, sensor intrinsic and extrinsic calibration, time synchronization, drive-end calibration, power and friction identification, safety threshold calculation, and other calibration tasks are carried out in sequence, generating a parameter set and performing OA consistency checks. This is followed by parameter solidification and safety-related operations, such as parameter signing, writing to protected storage, generating fault records, as well as optional processes like factory database registration, uploading the burned-in signed version, and issuing certificate licenses. Subsequently, end-of-line (EOL) factory verification is performed, including end-to-end use case testing and power-off emergency stop/limit testing; if passed, the parameters are copied to maintenance calibration, otherwise the product is packaged for shipment. Finally, upon power-up self-check, the system verifies parameter integrity; if incomplete and component change parameter mismatch occurs, it runs normally, otherwise it enters a safe state and prompts for recalibration. On-site service tools can also be used for recalibration, authorization/audit/signature rewrite.

Beneficial effects of the above technical solution: In the factory stage, the invention configures sensor intrinsic/extrinsic parameters, mechanical parameter calibration, and time synchronization/delay compensation, and binds and solidifies the parameters with the device serial number. During device operation, the controller drives and verifies using the solidified parameters, fundamentally avoiding the impact of errors caused by user installation on tracking accuracy.

Embodiment 11

The present invention provides an audio-visual playback device for intelligent user pose tracking, including any one of the aforementioned audio-visual playback systems.

Beneficial effects of the above technical solution: The present invention acquires the relative pose between the user and the display terminal in real time through the sensing unit. Based on this, the controller dynamically calculates the target display pose and generates a smooth trajectory under constraints of velocity, acceleration, and jerk limiting, ensuring that the included angle between the display surface normal and the user's line of sight, as well as the viewing distance, always remain within a comfortable range. Even when the user moves or changes pose, the actuator can make precise adjustments through multi-degree-of-freedom rotary joints, avoiding the need for the user to frequently adjust their body due to uncomfortable device pose, significantly reducing neck and eye fatigue, and improving comfort during long viewing sessions. Furthermore, a safety state machine is constructed based on near-field detection distance, external force/torque, or sensing data confidence level. When the user approaches the device, an external force impact occurs, or sensing data mismatch is detected, the system can promptly execute retreat or pause actions, effectively avoiding safety risks such as collisions or squeezing; once the risk is cleared, normal tracking control can be smoothly resumed, ensuring both device safety and continuity of user experience. In addition, the high reduction ratio transmission design of the rotary joint motor improves the driving stability and force control accuracy of the actuator, effectively reducing safety hazards of the actuator's mechanical actions caused by changes in the relative position data between the user and the display terminal during viewing. The present invention adopts an integrated structure that combines the display terminal, actuator, sensing unit, controller, and drive power supply into the same device or housing. During the factory stage, the internal/external parameters of the sensors, mechanical parameters are calibrated, and time synchronization/delay compensation are configured, and the parameters are bound and solidified to the device serial number. During device operation, the controller drives and verifies using the solidified parameters, fundamentally avoiding the impact of errors caused by user installation on tracking accuracy; at the same time, the trajectory planning of the present invention suppresses motion mutations through preset time window constraints, ensuring smooth and stable pose adjustments of the display terminal, reducing the likelihood of image shaking or jumping, and greatly improving viewing stability.

Embodiment 12

The present invention provides an audio-visual playback method for intelligent user pose tracking, including:

- collecting the relative pose data between the user and the display terminal and its confidence level;
- calculating a target display pose that meets the user's viewing relationship based on the relative pose data;
- within a preset time window and under constraints of velocity/acceleration/jerk limiting, generating a trajectory from the current display pose to the target display pose;
- driving the actuator to move along the trajectory to change the display position of the display terminal to the target display pose;
- constructing a safety state machine based on at least one of near-field detection distance, external force/torque, or the confidence level, when the entry conditions of the safety state machine are met, executing retreat or pause, and when the exit conditions are met, resuming the control of maintaining the user's viewing relationship.

Beneficial effects of the above technical solution: The invention acquires the relative pose between the user and the display terminal in real time or periodically (for example, at a frequency of 20 times per minute), then dynamically calculates the target display pose based on this, and generates a smooth trajectory under constraints of velocity, acceleration, and jerk limiting, so that the included angle between the display surface normal and the user's line of sight, as well as the viewing distance, are always maintained within a comfortable range. Even if the user moves or changes pose, the actuator can make precise adjustments through multi-degree-of-freedom rotary joints, avoiding the need for the user to frequently adjust their body due to uncomfortable device poses, significantly reducing neck and eye fatigue, and improving comfort during long-term viewing. Furthermore, a safety state machine is constructed based on near-field detection distance, external force/torque, or sensing data confidence level, so that when the user approaches the device, an external force impact occurs, or sensing data mismatches, retreat or pause actions can be promptly executed to effectively avoid safety risks such as collisions or squeezing; once the risk is eliminated, normal tracking control can be smoothly restored, ensuring both device safety and continuity of user experience. At the same time, the high reduction ratio transmission design of the rotary joint motor improves the driving stability and force control accuracy of the actuator, effectively reducing the safety hazards of mechanical actions of the actuator caused by changes in the relative position data between the user and the display terminal during viewing.

Embodiment 13

The present invention provides a computer-readable storage medium, on which a computer program is stored, the computer program being executed by the processor of the controller to implement the aforementioned audio-visual playback method.

Beneficial effects of the above technical solution: The present invention converts the audio-visual playback method (including logic such as pose tracking, trajectory planning, and safety state machine control) into a carrier of controller-executable instructions. Through solidifying and reading the instructions in the storage medium, a foundation is provided for the processor to stably execute the aforesaid audio-visual playback method.

Obviously, those skilled in the art can make various modifications and variations to the present invention without departing from the spirit and scope of the present invention. Therefore, if these modifications and variations of the present invention fall within the scope of the claims of the present invention and their equivalent technologies, the present invention is also intended to encompass these modifications and variations.

The invention claimed is:

1. An audio-visual playback system for intelligent user pose tracking, comprising: a display terminal, an actuator, a sensing unit, a controller and an integrated structure; wherein

- the actuator has at least two degrees of freedom, with at least one rotary joint actively driven by a motor through a high reduction ratio transmission, and carries a display terminal at an end;
- the sensing unit is configured to acquire relative pose data between a user and the display terminal and a confidence level of the relative pose data;
- the controller is configured to calculate a target display pose that meets a user's viewing relationship based on the relative pose data, and, under preset time window and velocity/acceleration/jerk limiting constraints, generate a trajectory from a current display pose to the target display pose, and drive the actuator to transform to the target display pose;
- based on at least one of a near-field detection distance, an external force/torque, or the confidence level, a safety state machine is constructed, and the safety state machine executes retreat or pause when entry conditions of the safety state machine are met, and, when exit conditions of the safety state machine are met, resumes a control of maintaining the user's viewing relationship; and the integrated structure incorporates the display terminal, the actuator, the sensing unit, the controller, and a drive power supply into a same device or housing.

2. The audio-visual playback system for intelligent user pose tracking according to claim 1, wherein the actuator is at least one of a linear lifting module, a pitching module/an azimuth module, or a combination thereof, forming a 2-degree-of-freedom or 3-degree-of-freedom mechanism.

3. The audio-visual playback system for intelligent user pose tracking according to claim 2, wherein the at least two degrees of freedom comprise a degree of freedom for changing a distance between the user and the display terminal;

wherein, the degree of freedom for changing the distance between the user and the display terminal is an electric linear lift and/or rotation around an axis that is not parallel to a normal of a display surface.

4. The audio-visual playback system for intelligent user pose tracking according to claim 1, wherein the controller, under the preset time window and velocity/acceleration/jerk limiting constraints, generates the trajectory from the current display pose to the target display pose, comprising:

when the user's viewing relationship deviates from a corresponding threshold, the controller performs online re-planning and within a preset time window generates a trajectory that meets a jerk limiting; and otherwise, within the preset time window, a trajectory meeting a velocity/acceleration limiting is generated.

5. The audio-visual playback system for intelligent user pose tracking according to claim 1, wherein the viewing relationship at least constrains an included angle between a normal of a display surface of the display terminal and a user's line of sight direction and/or a distance between a user's observation point and the display surface.

6. The audio-visual playback system for intelligent user pose tracking according to claim 1, wherein the near-field detection distance is detected through at least one of a camera, an infrared camera, structured light, time-of-flight sensing, millimeter-wave radar, or ultrasound.

7. The audio-visual playback system for intelligent user pose tracking according to claim 1, wherein the external force or torque is detected using observation and estimation of motor current/back electromotive force and/or an end/joint torque sensor.

8. The audio-visual playback system for intelligent user pose tracking according to claim 1, wherein the sensing unit is arranged at at least one location among the display terminal, the actuator, an environment fixed point, or a user-wearable end, and performs time synchronization and data fusion via a communication link.

9. The audio-visual playback system for intelligent user pose tracking according to claim 1, wherein the safety state machine comprises states of normal following, early warning, retreat/pause, and recovery;

conditions for entering a safety state comprise at least one of near-field detection distance<R_safe, joint torque/end force>τ_max/F_max, confidence level p<p_min, or loss time>t_lost;

wherein, the near-field detection distance comprises the distance between the user and an end or connecting rod; and conditions for exiting the safe state comprise at least one of risk elimination, stable timing meeting t_stable as well as manual authorization.

10. The audio-visual playback system for intelligent user pose tracking according to claim 1, wherein the integrated structure is calibrated at a factory stage for intrinsic parameters of sensors as well as extrinsic parameters between the sensors and the display terminal and actuators, and the integrated structure is configured for time synchronization/delay compensation, mechanical parameters, and safety thresholds;

calibrated parameters and configured parameters are respectively bound to a device serial number and solidified for storage; and during operation, the controller performs verification and control based on solidified stored parameters, and enters a safe state and/or prompts for recalibration when component replacement or parameter mismatch is detected.

11. An audio-visual playback device for intelligent user pose tracking, comprising the audio-visual playback system according to claim 1.

12. An audio-visual playback method for intelligent user pose tracking, comprising:

collecting relative pose data between a user and a display terminal and a confidence level of the relative pose data;

calculating a target display pose that meets a user's viewing relationship based on the relative pose data;

within a preset time window and under velocity/acceleration/jerk limiting constraints, generating a trajectory from a current display pose to the target display pose;

driving an actuator to move along the trajectory to change a display position of the display terminal to the target display pose; and constructing a safety state machine based on at least one of a near-field detection distance, an external force/torque, or the confidence level, when entry conditions of the safety state machine are met, executing retreat or pause, and when exit conditions of the safety state machine are met, resuming a control of maintaining the user's viewing relationship.

13. A computer-readable storage medium, wherein a computer program is stored on the computer-readable storage medium, and the computer program is executed by a processor of a controller to implement the audio-visual playback method according to claim 12.

14. The audio-visual playback device for intelligent user pose tracking according to claim 11, wherein the actuator is at least one of a linear lifting module, a pitching module/an azimuth module, or a combination thereof, forming a 2-degree-of-freedom or 3-degree-of-freedom mechanism.

15. The audio-visual playback device for intelligent user pose tracking according to claim 14, wherein the at least two degrees of freedom comprise a degree of freedom for changing a distance between the user and the display terminal;

wherein, the degree of freedom for changing the distance between the user and the display terminal is an electric linear lift and/or rotation around an axis that is not parallel to a normal of a display surface.

16. The audio-visual playback device for intelligent user pose tracking according to claim 11, wherein the controller, under the preset time window and velocity/acceleration/jerk limiting constraints, generates the trajectory from the current display pose to the target display pose, comprising:

when the user's viewing relationship deviates from a corresponding threshold, the controller performs online re-planning and within a preset time window generates a trajectory that meets a jerk limiting; and otherwise, within the preset time window, a trajectory meeting a velocity/acceleration limiting is generated.

17. The audio-visual playback device for intelligent user pose tracking according to claim 11, wherein the viewing relationship at least constrains an included angle between a normal of a display surface of the display terminal and a user's line of sight direction and/or a distance between a user's observation point and the display surface.

18. The audio-visual playback device for intelligent user pose tracking according to claim 11, wherein the near-field detection distance is detected through at least one of a camera, an infrared camera, structured light, time-of-flight sensing, millimeter-wave radar, or ultrasound.

19. The audio-visual playback device for intelligent user pose tracking according to claim 11, wherein the external force or torque is detected using observation and estimation of motor current/back electromotive force and/or an end/joint torque sensor.

20. The audio-visual playback device for intelligent user pose tracking according to claim 11, wherein the sensing unit is arranged at at least one location among the display terminal, the actuator, an environment fixed point, or a user-wearable end, and performs time synchronization and data fusion via a communication link.

* * * * *